Patented Dec. 2, 1952

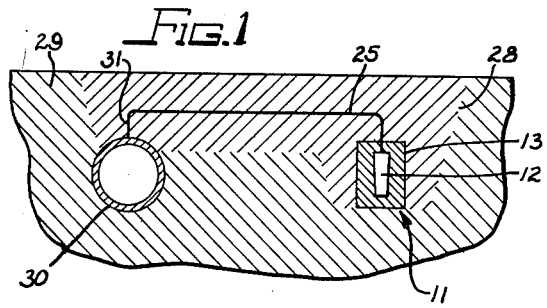
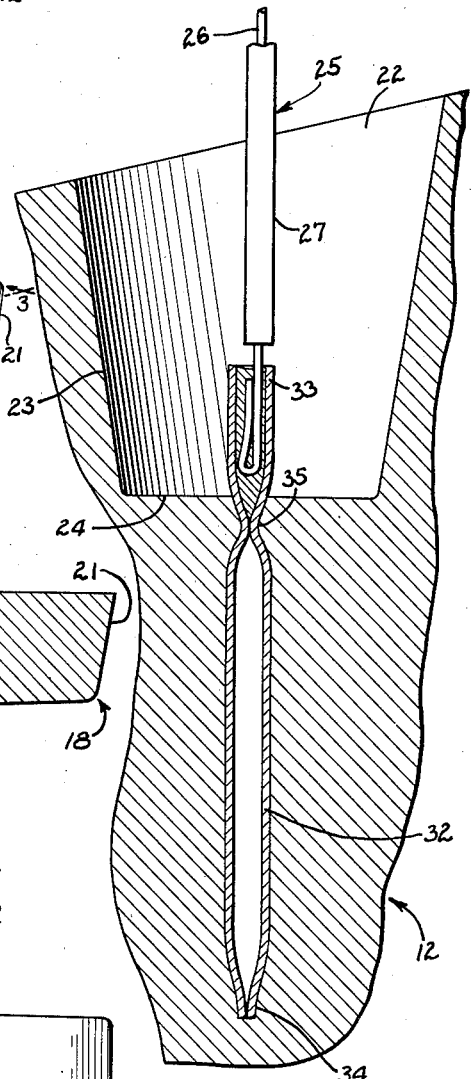
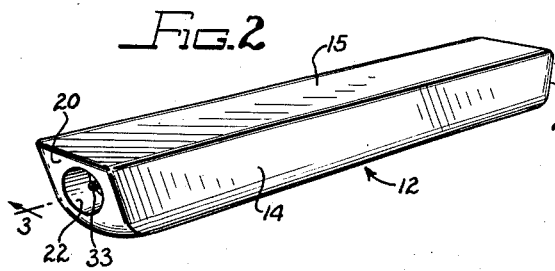
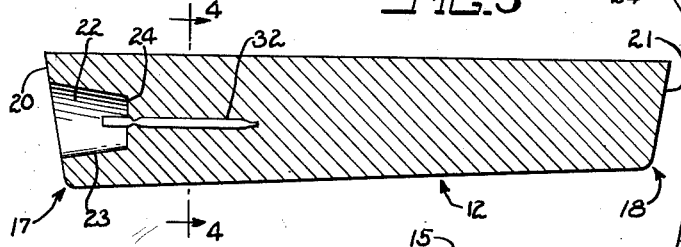
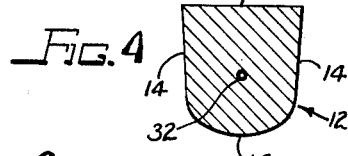
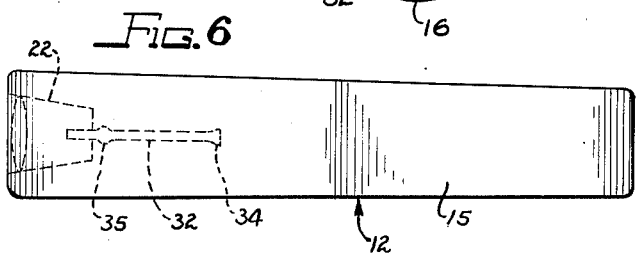

2,620,297

UNITED STATES PATENT OFFICE 2,620,297

ANODE STRUCTURE

John Joseph Stobie, Chicago, and Howard Robert Youngkrantz, Lombard, Ill., assignors to Apex Smelting Company, Chicago, Ill., a corporation of Illinois Application June 27, 1950, Serial No. 170,544

3 Claims. (Cl. 204—197)

The present invention relates in general to the galvanic protection of buried metal objects, and has more particular reference to an improved anode structure for use in galvanic protection systems.

Galvanic systems for cathodic protection of underground or water submerged pipe lines and like metal structures may comprise metal anodes buried or submerged near the structure to be protected and electrically connected therewith by suitable insulated conductors. The anode comprises metal selected to function anodically when electrically connected with the structure to be protected so that the latter will function as a cathode in order to induce electrical current flow therefrom to the anode and not vice versa. The resulting flow of current serves to maintain the protected structure as a cathode with respect to the surrounding soil or moisture and thus greatly minimizes electrolytic corrosion. The employment of galvanic anodes, by eliminating the possibility of electrical current flow to the protected structure, serves to prevent anodic pitting and consequent deterioration of the protected structure.

Magnesium or alloys of magnesium are particularly well suited for use as galvanic anodes of the character mentioned, and it is highly desirable, if not essential, that the electrical connection or bond between the anode and the conductor through which it is connected with the protected structure be adequate to assure return flow of the anodic current. For practical purposes also in the installation or placement of the anode in buried position, it is desirable that the anode connected conductor have sufficient mechanical strength to support the weight of the anode during the placement thereof in buried position, the suspended weight thus required to be carried being of the order of 100 pounds.

An important object of the present invention is to provide an improved galvanic anode of the character mentioned and comprising a block of magnesium or magnesium alloy having a suitable conductor attached thereto in fashion providing adequate electrical connection between the conductor and the anode and at the same time affording a mechanical connection of sufficient strength to permit suspension of the anode on the conductor for manipulative purposes during the placement of the anode in buried or submerged position; a further object being to provide an improved, inexpensive electrical and mechanical connection between the insulated conductor and the magnesium anode whereby the anode may be carried on the conductor and, after placement in situ in buried position adjacent the structure to be protected, may be electrically connected with such structure through said insulated conductor.

The foregoing and numerous other objects, advantages and inherent functions of the invention will be more fully understood from the following description which, taken in connection with the accompanying drawings, discloses a preferred embodiment of the invention.

Referring to the drawings:

Fig. 1 is a sectional view through a transversal of a buried metal structure and electrically connected galvanic anode embodying the present invention;

Fig. 2 is a perspective view of the anode;

Figs. 3 and 4 are sectional views, respectively taken substantially along the lines 3—3 and 4—4 in Figs. 2 and 3;

Fig. 5 is an enlarged view of a portion of the structure shown in Fig. 3; and

Fig. 6 is a top plan view of the anode.

To illustrate the invention the drawings show a packaged anode 11 comprising an anode element 12 imbedded in a backfill package 13, which may consist of any suitable, preferably, finely divided or granular electrolytic material of non-acid character, such as the hydroxides of an alkaline-earth metal, of which gypsum is an example. This electrolytic material may be and is preferably mixed with powdered cement as a binder, in quantities of the order of ten to twenty-five per cent and may contain filler material such as sand, gravel and the like. This electrolytic material may be packed around the anode 12 and held in place in a suitable container or retainer such as a bag or carton.

The anode 12 comprises an elongated block of metal such as magnesium, preferably formed as a casting, the block having preferably flat side walls 14 and flat top wall 15 and a rounded bottom wall 16, all of which are taperingly inclined from the larger end 17 toward the smaller end 18 of the block. The end walls 20 and 21 of the block also are preferably downwardly and inwardly inclined and form rounded corners with the bottom wall 16, such particular shape being preferred in order to facilitate the formation of the block as a casting. The block is formed with an axial cavity 22 at the large end of the block, said cavity preferably having conical side surfaces 23 and a flat bottom 24 extending normally of the longitudinal axis of the block.

An insulated cable 25, comprising a wire 26 of electrically conducting material, such as copper, enclosed in an insulating coating or sheath 27, is electrically connected, at one end of the conductor 26, with the block 12, preferably at the larger end 17 thereof, and extends from the block at said end and thence outwardly of the package 13 so that the conductor 25 may be used as a means for carrying the package and for manipulating the same during placement thereof in situ. In this connection, the packaged anode is ordinarily placed in a suitable hole 28, formed in the earth 29 adjacent a metal object such as a pipe 30 to be cathodically protected by the anode. The packaged anode, consequently, may be lowered into the hole 29 by means of its cable 25 which may then be electrically connected with the metal object 30 as at 31, and the hole may then be refilled with earth to complete the installation.

In order to form a strong mechanical and good electrical connection between the copper conductor wire 26 of the cable 25 and the magnesium metal of the anode block 12, copper and magnesium being difficultly joinable, both mechanically and electrically, the present invention teaches how to make an exceptionally inexpensive yet mechanically strong and electrically adequate junction of the cable with the block. To this end, a preferably elongated tube 32 of electrically conducting material, such as copper, is imbedded in the block 12 during the formation thereof as a casting. This tube is of substantial length of the order of five inches or more and is imbedded in the block in alinement with the longitudinal axis of the end cavity 22 with the open end 33 of the tube extending in the cavity 22 through the bottom wall 24 thereof, the tube end 33 terminating an appreciable distance of the order of one inch outwardly of said bottom wall 24. The inner or imbedded end 34 of the tube is preferably crimped flat, as shown more particularly in Figs. 5 and 6, and the tube may also be crimped as at 35, intermediate the ends of the tube, preferably at or near the bottom wall 24 of the end cavity 22, in position imbedded in the material of the block. The foregoing arrangement permits maximum integration of the copper tube with the enveloping magnesium, thus providing good electrical connection between the tube and the block. The arrangement also provides for strong mechanical conjunction of the parts, which is augmented by the crimping of the tube at 34 and 35. This crimping not only affords augmented mechanical strength in the connection but serves also to facilitate the connection of the cable 25 as by soldering the bared end of the conductor 26 in the cavity afforded within the exposed end 33 of the connection tube 32. The cable 25 is connected with the block 12, preferably by stripping the insulation 27 from the conductor wire 26, at the end of the cable through a distance of the order of twice the length of the exposed end of the tube 32. The so bared ends of the conductor 26 may then be folded upon itself, as shown more particularly in Fig. 5, and inserted into the opening end of the tube 33 within the cavity 22. Thereupon the end of the conductor 26 may be soldered firmly in place in the ends of the tube and thus integrated therewith, the crimping at 35 serving to facilitate the soldering operation by retaining the solder in the end of the tube around the bent end portions of the conductor wire.

After completion of the soldering operation the cavity 22 may be and preferably is filled up with any suitable, preferably plastic, insulating compound in order to cover the soldered joint and exclude moisture therefrom.

After formation of the anode and the connection therewith of the conductor cable 25, the anode may be assembled in the package 13, whereupon it is immediately in condition for application to the cavity protection of underground or water submerged pipe lines.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. An anode for a cathodic protection system comprising an elongated block of magnesium metal, formed with an end cavity, a copper tube imbedded in and having an end projecting outwardly of said block, within said cavity, said tube being crimped at its imbedded end and inwardly of its projecting end, thereby forming spaced apart flattened tube portions imbedded in the material of the block and hence adapted firmly to interlock the tube with the material of the block and to form a soldering pocket at the projecting end of the tube, a copper conductor having a rebent end forming a soldering lug extending within the exposed end of the tube and integrated therewith by soldering, and a plastic sealing compound enveloping the joined ends of said conductor and tube in said cavity.

2. An anode for a cathodic protection system comprising an elongated block of magnesium metal having side surfaces tapering toward one end of the block, said block being formed with an end cavity in its other end, a copper tube imbedded in and having an end projecting outwardly of said block within said cavity, said tube being crimped at its imbedded end and inwardly of its projecting end, thereby forming spaced apart flattened tube portions imbedded in the material of the block and hence adapted firmly to interlock the tube with the material of the block and to form a soldering pocket opening, at the projecting end of the tube, in said end cavity, a copper conductor having a rebent end forming a soldering lug extending in said pocket and integrated with the tube by soldering.

3. An anode for a cathodic protection system comprising an elongated block of magnesium metal, formed with an end cavity, a copper tube embedded in and having an end projecting outwardly of said block, within said cavity, said tube being crimped at its embedded end and inwardly of its projecting end, thereby forming spaced apart flattened tube portions embedded in the material of the block and hence adapted firmly to interlock the tube with the material of the block and to form a soldering pocket at the projecting end of the tube.

JOHN JOSEPH STOBIE.
HOWARD ROBERT YOUNGKRANTZ.

REFERENCES CITED

The following references are of record in the file of this patent:

UNITED STATES PATENTS

| Number | Name | Date |
|---|---|---|
| 2,258,750 | Eichwald | Oct. 14, 1941 |

OTHER REFERENCES

"Magnesium Anodes for Cathodic Protection," page 9, Dow Chemical Co., Midland, Michigan, copyright 1946.